US012264697B2

(12) United States Patent
Wang et al.

(10) Patent No.: US 12,264,697 B2
(45) Date of Patent: Apr. 1, 2025

(54) FASTENER STRUCTURE AND ASSEMBLY METHOD THEREOF

(71) Applicant: FIVETECH TECHNOLOGY INC., New Taipei (TW)

(72) Inventors: Ting-Jui Wang, New Taipei (TW); Hsin-Lin Huang, New Taipei (TW); Wei-Chen Huang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 236 days.

(21) Appl. No.: 17/583,237

(22) Filed: Jan. 25, 2022

(65) Prior Publication Data
US 2022/0243753 A1 Aug. 4, 2022

(30) Foreign Application Priority Data
Feb. 3, 2021 (TW) .................................. 110104044

(51) Int. Cl.
*F16B 21/04* (2006.01)
(52) U.S. Cl.
CPC .................................. *F16B 21/04* (2013.01)
(58) Field of Classification Search
CPC .. F16B 21/04; F16B 5/10; F16B 21/02; F16B 21/07
See application file for complete search history.

(56) References Cited

U.S. PATENT DOCUMENTS

| 4,378,615 A * | 4/1983 | Gunther .................... F16B 5/10 411/555 |
| 5,513,622 A * | 5/1996 | Musacchia, Sr. ..... F41B 5/1426 403/349 |
| 5,716,180 A * | 2/1998 | Bowers ..................... F16B 5/10 411/553 |
| 6,379,076 B1 * | 4/2002 | Reinhold ................ F16B 21/04 403/348 |
| 6,898,824 B2 * | 5/2005 | Zaltron ................ A63C 11/221 403/377 |
| 7,980,781 B2 * | 7/2011 | Trice ........................ B25G 3/16 403/349 |
| 8,197,155 B2 * | 6/2012 | Noh ..................... H01R 13/625 403/348 |
| 11,370,104 B2 * | 6/2022 | Takada ..................... B25G 3/04 |
| 11,795,982 B2 * | 10/2023 | Koolmeister ........... F16B 7/046 |
| 2003/0231927 A1 * | 12/2003 | Hale ...................... B08B 9/045 403/349 |

(Continued)

FOREIGN PATENT DOCUMENTS

CN 208474289 U 2/2019

*Primary Examiner* — David M Upchurch

(57) ABSTRACT

A fastener structure and an assembly method thereof are introduced. The fastener structure includes a body and a fastener. The body has a limiting structure and is for assembling at a first object. The fastener and the body are movably assembled. The fastener has a limiting portion, which coordinates with the limiting structure to limit a movement stroke of the fastener, so as to engage or disengage the fastener with or from a second object. Thus, the body can be assembled with the first object and the fastener can be engaged with or disengaged from the second object so as to complete quick coupling and separation of two objects, further achieving effects of repeated quick coupling and separation.

15 Claims, 9 Drawing Sheets

(56) References Cited

U.S. PATENT DOCUMENTS

| | | | | |
|---|---|---|---|---|
| 2010/0279535 A1* | 11/2010 | McQuilken | .......... | H01R 13/625 |
| | | | | 439/332 |
| 2012/0144626 A1* | 6/2012 | Lanz | ........................ | B25G 1/04 |
| | | | | 16/427 |
| 2016/0186792 A1* | 6/2016 | Valencia | ................ | F16B 7/0406 |
| | | | | 403/349 |
| 2021/0372452 A1* | 12/2021 | Schlack | ................. | H01L 23/467 |
| 2022/0268309 A1* | 8/2022 | Tsorng | .................. | F16B 45/002 |
| 2022/0362614 A1* | 11/2022 | Bugeaud | ................. | F16B 21/02 |

\* cited by examiner

FASTENER STRUCTURE AND ASSEMBLY METHOD THEREOF

CROSS-REFERENCE TO RELATED APPLICATION

This non-provisional application claims priority under 35 U.S.C. § 119(a) on Patent Application No(s). 110104044 filed in Taiwan, R.O.C. on Feb. 3, 2021, the entire contents of which are hereby incorporated by reference.

BACKGROUND OF THE INVENTION

1. Field of the Invention

The present disclosure provides a fastener structure and an assembly method thereof, and in particular to a fastener structure for repeatedly and quickly coupling and separating at least one object and an assembly method thereof.

2. Description of the Related Art

In general, when at least one object is to be coupled, lock connection is usually performed using a screw for coupling the object.

In the conventional fixing means above, although at least one object can be fixed and coupled in a form that is not easily separated, in addition to unhandy assembly, the least one object may not be easily removed due to the fixed coupling means using the screw.

BRIEF SUMMARY OF THE INVENTION

In view of the prior art above, the inventor provides a fastener structure and an assembly method thereof in aim of achieving effects of repeated and quickly coupling and separation.

To achieve the above and other objects, the present disclosure provides a fastener structure including a body and a fastener. The body has a limiting structure and is for assembling at a first object. The fastener and the body are movably assembled. The fastener has a limiting portion, which coordinates with the limiting structure to limit a movement stroke of the fastener, so as to engage or disengage the fastener with or from a second object.

In the fastener structure above, the limiting structure is located on one side of the body.

In the fastener structure above, a bottom portion of the body is provided with an assembly portion, which is for assembling the body at the first object.

In the fastener structure above, the limiting structure is a protrusion or a recess.

In the fastener structure above, the fastener includes an engaging portion and a head, and the limiting portion is arranged at the head, so that the limiting portion coordinates with the limiting structure to limit a movement stroke of the head, allowing the engaging portion to engage with or disengage from the second object.

In the fastener structure above, the engaging portion is coupled at the head, and the engaging portion is coupled at the head via a joining portion, or the engaging portion and the head are a formed integral.

In the fastener structure above, an outer edge of the head has an anti-slip portion.

In the fastener structure above, the engaging portion is an outer fastener, an inner fastener, a column, an elastic fastener or a threaded body.

In the fastener structure above, the limiting portion has a first limiting section, a second limiting section and a communicating section. The first limiting section and the second limiting section are located on two sides of the communicating section, and the communicating section is in communication with the first limiting section and the second limiting section, so that the first limiting section, the communicating section and the second limiting section coordinate with the limiting structure to limit the movement stroke of the fastener.

In the fastener structure above, the limiting portion has a first limiting section and a communicating section. The communicating section and the first limiting section coordinate with the limiting structure to limit the movement stroke of the fastener.

In the fastener structure above, the limiting portion has a second limiting section and a communicating section. The communicating section and the second limiting section coordinate with the limiting structure to limit the movement stroke of the fastener.

In the fastener structure above, the first limiting section and the second limiting section limit an up-and-down movement stroke of the fastener.

In the fastener structure above, the communicating section limits a rotational movement stroke of the fastener.

In the fastener structure above, the first limiting section or the second limiting section is patterned as a long limiting section or a short limiting section, wherein the long limiting section is for recovering a stoke of the engaging portion, and the short limiting section is for limiting the engaging portion at a positioned position after the engaging portion is engaged.

In the fastener structure above, the first limiting section or the second limiting section is patterned as a long limiting section or a short limiting section, wherein the long limiting section is for limiting the engaging portion at a positioned position after the engaging portion is engaged, and the short limiting section is for recovering a stoke of the engaging portion.

The fastener structure above further includes an elastic unit. Two ends of the elastic unit are pressed against the body and the fastener, respectively. With the pressing of the elastic unit, the fastener is constantly located at an engaging position, or constantly located at a disengaging position. Alternatively, a force of the spring force of the elastic unit constantly pushes the head of the fastener away from the body or constantly pulls the head of the fastener close to the body.

In the fastener structure above, the limiting portion is a limiting groove without an entrance, or the limiting portion is a limiting groove with an entrance.

In the fastener structure above, the limiting structure passes through a hole on one side of the body so as to be assembled at another hole of the body.

In the fastener structure above, the body has a direction positioning portion, and the first object has a corresponding direction positioning portion for correspondingly positioning a relative position or a relative assembly position of an assembly portion, an engaging portion, a head, a body, a second object, a limiting portion, a limiting structure, a first limiting section, a second limiting section or a second object, so as to provide aligned engagement or corresponding rotational engagement during assembly.

In the fastener structure above, the limiting structure is assembled on one side of the body by means of rivet connection or expansion connection, or the limiting structure and the body are a formed integral.

In the fastener structure above, the limiting portion is a through groove structure with an entrance.

In the fastener structure above, the limiting structure is assembled on one side of the body by means of rivet connection or expansion connection, and the limiting structure has a stop portion for stopping at a stop position of the rivet connection or expansion connection of the limiting structure.

In the fastener structure above, the limiting structure has a block portion, a width of the block portion is larger than that of the limiting portion, and the block portion and the limiting portion perform non-rotational or rotational positioning.

In the fastener structure above, the body or the fastener is formed by means of metal injection molding, plastic injection molding, injection molding, CNC processing molding, forging molding or rolling molding.

An assembly method of a fastener structure is further provided according to the present disclosure. The elastic unit is first arranged on the body, the head of the fastener is arranged at the body, and the limiting structure is passed through the limiting portion, so that the limiting structure is assembled at the body and is then limited at the limiting portion.

An assembly method of a fastener structure is further provided according to the present disclosure. The elastic unit is first arranged on the body, the head of the fastener is elastically pressed downward and arranged at the body, and the limiting structure is passed through the limiting portion, so that the limiting structure is assembled at the body and is then limited at the limiting portion.

An assembly method of a fastener structure is further provided according to the present disclosure. The fastener is first arranged on the body, and the limiting structure is passed through the limiting portion, so that the limiting structure is assembled at the body and is then limited at the limiting portion.

An assembly method of a fastener structure is further provided according to the present disclosure. The limiting structure is first assembled at the body, the elastic unit is placed at the body, the head of the elastic unit is placed so that the limiting structure enters the limiting portion, and then the engaging portion of the fastener is assembled at the head of the fastener so as to be movably assembled with the body.

An assembly method of a fastener structure is further provided according to the present disclosure. The limiting structure is first assembled at the body, the head of the fastener is placed so that the limiting structure enters the limiting portion in a longitudinal direction, and then the engaging portion of the fastener is assembled at the head of the fastener so as to be movably assembled with the body.

An assembly method of a fastener structure is further provided according to the present disclosure. The limiting structure is first assembled at the body, and then the fastener is placed so that the limiting structure enters the limiting portion so as to be movably assembled with the body.

In the assembly method of a fastener structure above, the fastener has an engaging portion and a head, and once the limiting structure completely enters the limiting portion, one end of the engaging portion of the fastener that is non-engaged with the second object is then assembled with the head.

In the assembly method of a fastener structure above, the limiting structure passes through a hole of the body so as to be assembled at another hole of the body, wherein the hole is larger than the another hole, and the another hole is smaller than the limiting structure, so that the limiting structure can first pass through the hole and then be assembled at the another hole.

In the assembly method of a fastener structure above, the body has a tool opening and an assembly opening corresponding to each other. The tool opening is for an assembly tool to enter the body and for the assembly tool to assemble the limiting structure at the assembly opening.

In the assembly method of a fastener structure above, the tool opening is larger than the assembly opening.

In the fastener structure above, the limiting structure is configured to be assembled with the body or the limiting structure and the body are a formed integral.

In the assembly method of a fastener structure above, the elastic unit is a torsion spring having one end pressing against the body and the other end pressing against the fastener, so that the fastener reciprocally rotates due to a torsion force.

Thus, with the fastener structure of the present disclosure, the body can be assembled with the first object and the fastener can be engaged with the second object or be disengaged from the second object, so as to complete quick coupling and separation of two objects, further achieving the object of repeated quick coupling and separation.

DETAILED DESCRIPTION OF THE INVENTION

Figure 1:
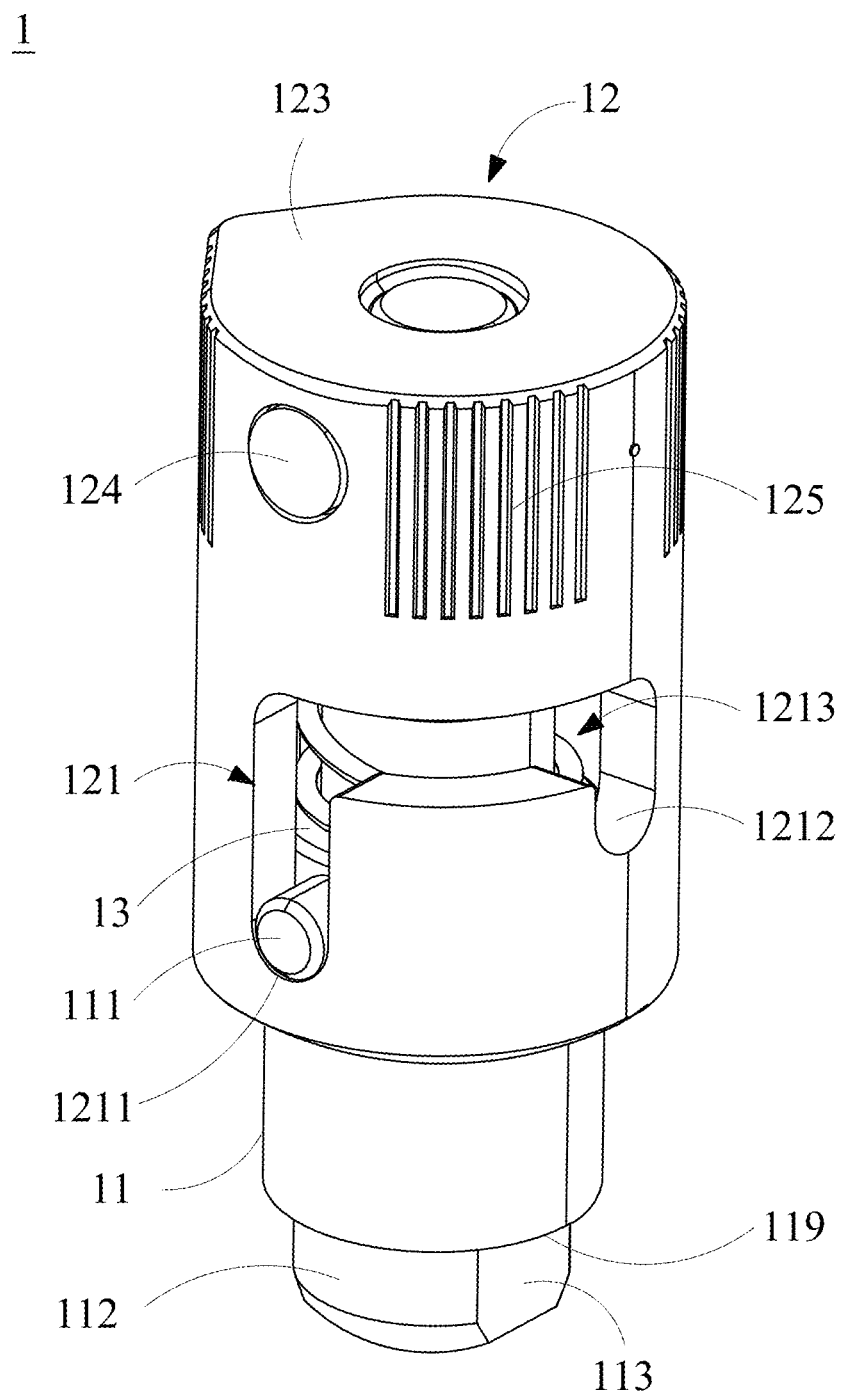
FIG. 1 is a schematic diagram of an appearance of a fastener structure of the present disclosure.

To facilitate understanding of the object, characteristics and effects of this present disclosure, embodiments together with the attached drawings for the detailed description of the present disclosure are provided.

Referring to FIG. 1 to FIG. 5, as shown in the drawings, the present disclosure provides a fastener structure and an assembly method thereof, wherein the fastener structure 1 includes a body 11 and a fastener 12.

The body 11 has a limiting structure 111, the limiting structure 111 may be patterned as a protrusion (or a recess), and the body 11 is for assembling at a first object 10, wherein the limiting structure 111 may be located on one side of the body 11.

The fastener 12 and the body 11 are movably assembled. The fastener 12 has a limiting portion 121, which coordinates with the limiting structure 111 to limit a movement stroke of the fastener 12, so that the fastener 12 is engaged with or disengaged from a second object 20, wherein the limiting portion 121 is a limiting groove without an entrance.

To put to use, the fastener structure 1 may be assembled on the first object 10 via the body 11, and the fastener 12 is then moved for engagement or disengagement. When the fastener 12 moves, the fastener 12 may first be pressed downward to release the limiting portion 121 from the limitation of the limiting structure 111, and the fastener 12 is turned to engage or disengage the fastener 12 with or from the second object 20. Once the fastener 12 is engaged or disengaged, the limiting structure 111 then coordinates with the limiting portion 121 to limit the position of the actuated fastener 12. Thus, the body 11 can be assembled with the first object 10, and the fastener 12 can be engaged with the second object 20 or be disengaged from the second object 20 so as to complete quick coupling and separation of the two objects, further achieving effects of repeated quick coupling and separation.

In one embodiment of the present disclosure, a bottom portion 119 of the body 11 is provided with an assembly portion 112, which is for assembling the body 11 at the first object 10. The assembly portion 112 may be securely combined with the first object 10 by means of stamping, expansion connection, welding connection or lock connection, so as to facilitate the fastener 12 to perform associated operations and use on the body 11.

Figure 2:
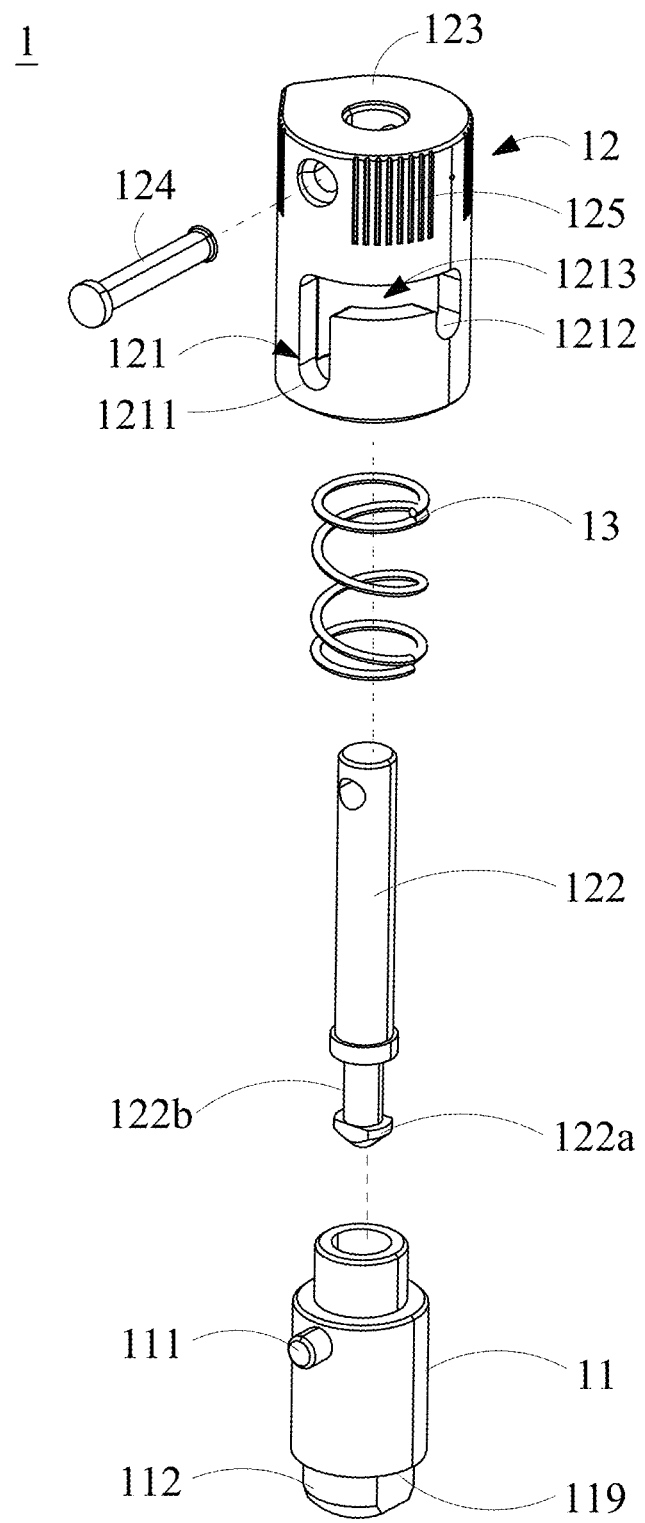
FIG. 2 is an exploded schematic diagram of a fastener structure of the present disclosure.
Figure 3:
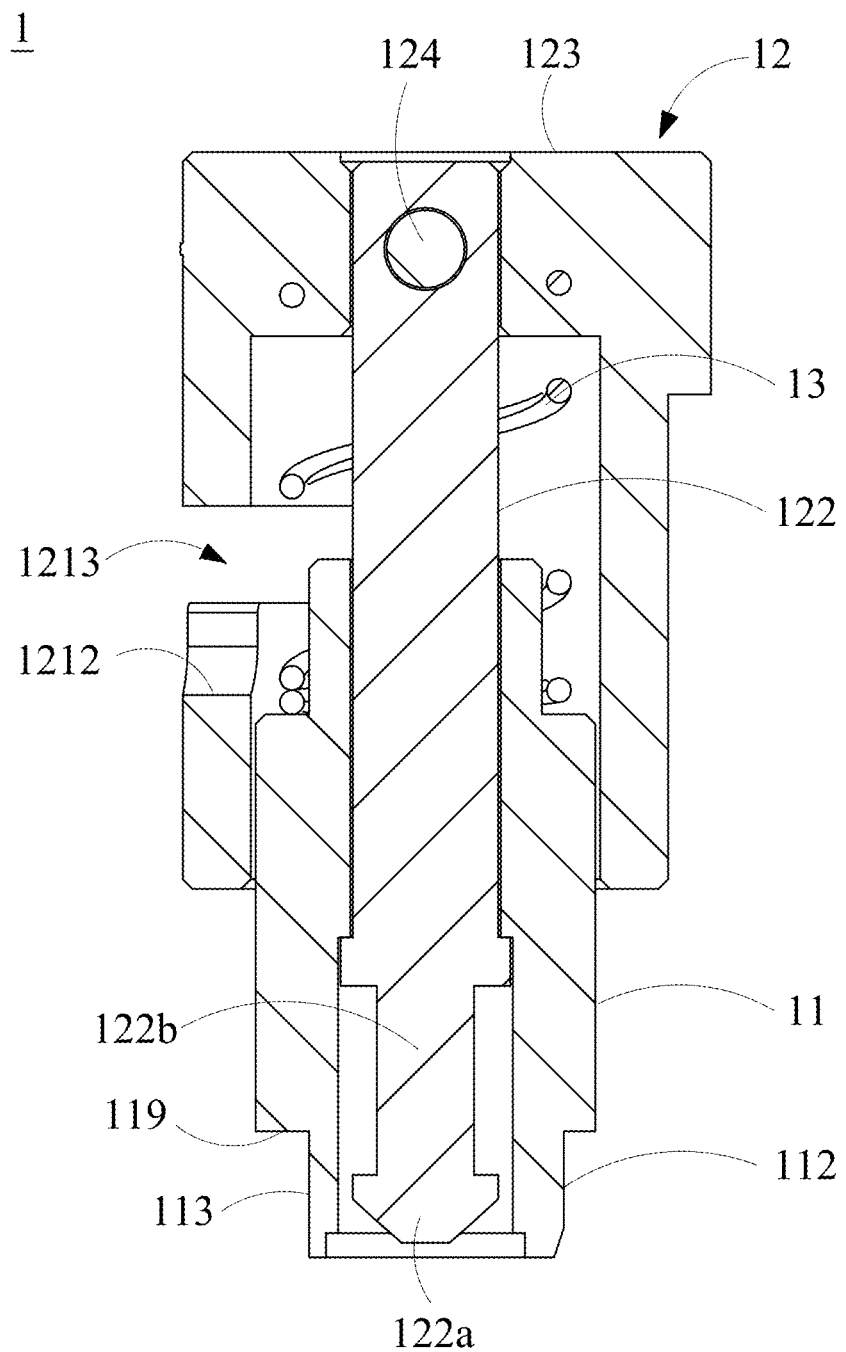
FIG. 3 is a section schematic diagram of a fastener structure of the present disclosure.
Figure 4:
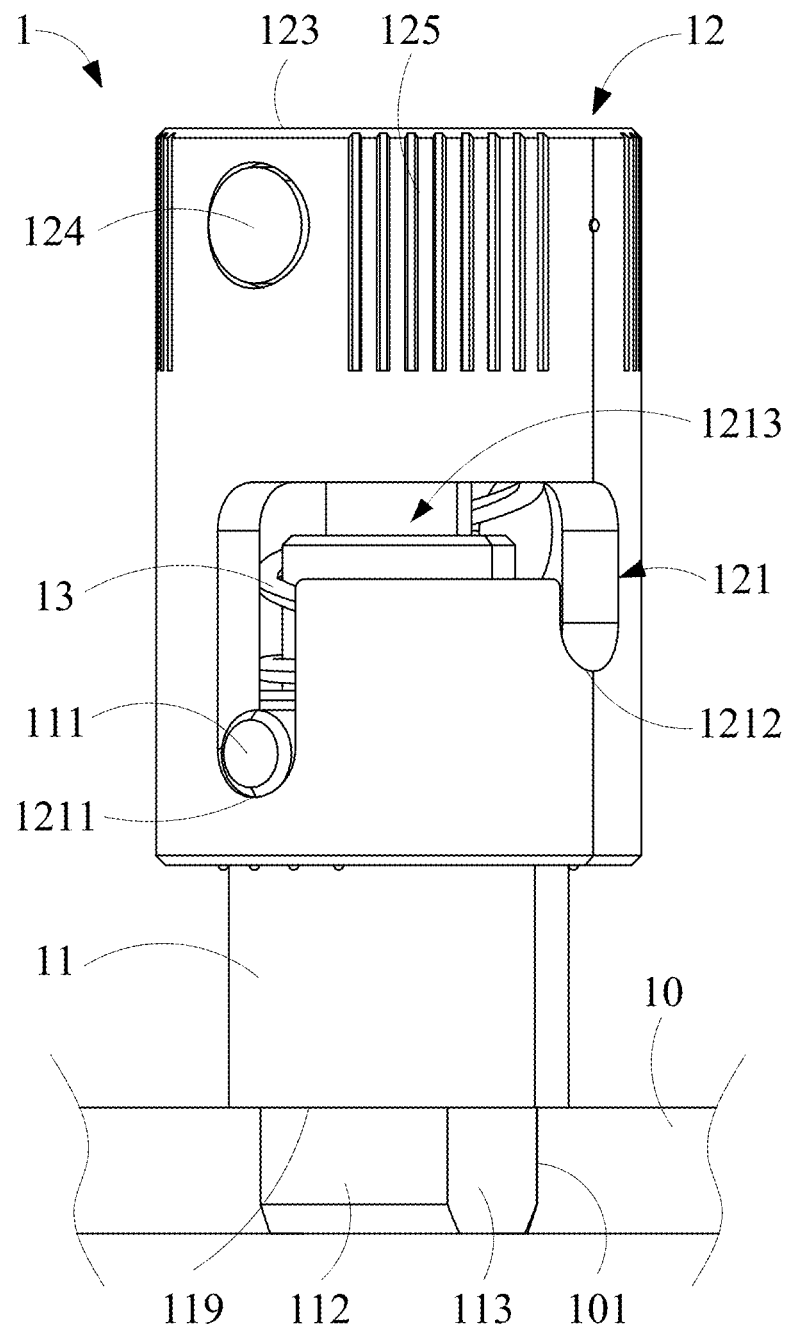
FIG. 4 is a first schematic diagram of a fastener structure in a state of use of the present disclosure.
Figure 5:
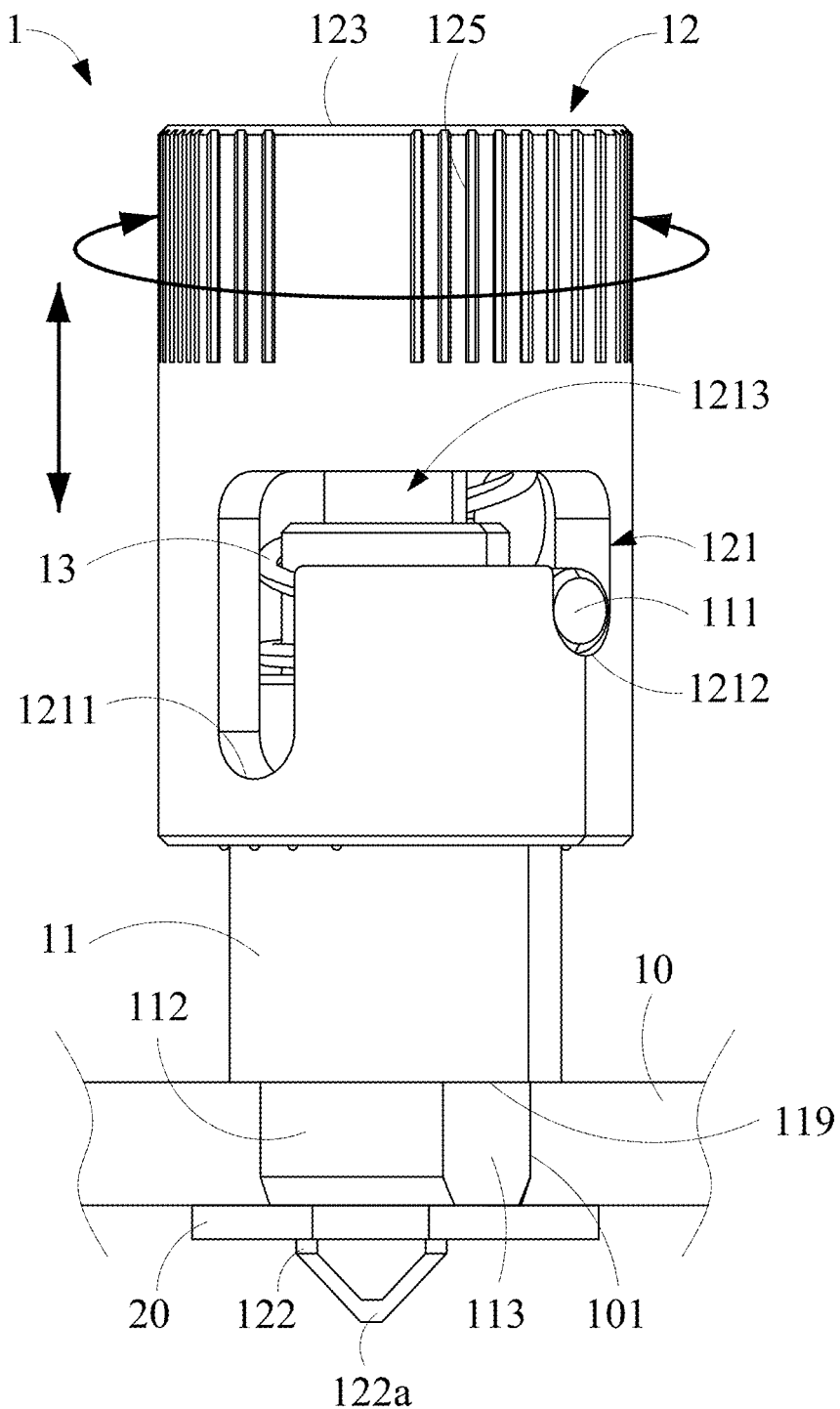
FIG. 5 is a second schematic diagram of a fastener structure in a state of use of the present disclosure.

In one embodiment of the present disclosure, the fastener 12 includes an engaging portion 122 and a head 123. The engaging portion 122 is coupled at the head 123 (or the engaging portion 122 and the head 123 are a formed integral), and the limiting portion 121 is arranged on a side edge of the head 123. In the present disclosure, the engaging portion 122 is coupled at the head 123 via a joining portion 124 (for example, a bolt). As shown in FIGS. 2, 3 and 5, the engaging portion 122 is a rod, the engaging portion 122 has a blocking portion 122a at one end (see FIGS. 2,3 and 5), the assembly portion 112 and the blocking portion 122a are at same side relative to the body 11 (see FIG. 3), the engaging portion 122 has a narrow section 122b adjacent to the blocking portion 122a (see FIGS. 2 and 3), the first object 10 and the second object 20 are overlapped and fastened to the body 11 by the blocking portion 122a (see FIG. 5). As such, during operation, a force is applied on the head 123, and the head 123 is first pressed downward to release the limiting portion 121 from the limitation of the limiting structure 111 and at the same time to have the engaging portion 122 extend out of the body 11. Moreover, the head 123 is turned to engage or disengage the engaging portion 122 with or from the second object 20. Once the engaging portion 122 is engaged or disengaged, the limiting structure 111 coordinates with the limiting portion 121 to limit the position of the actuated fastener 12. Thus, the body 11 can be assembled with the first object 10, and the fastener 12 can be engaged with the second object 20 or be disengaged from the second object 20 so as to complete quick coupling and separation of the two objects, further achieving effects of repeated quick coupling and separation.

In one embodiment of the present disclosure, an outer edge of the head 123 has an anti-slip portion 125. Thus, when a force is applied on the head 123 for actuation, an anti-slipping effect is achieved by the anti-slip portion 125, hence facilitating various operations of the head 123.

In one embodiment of the present disclosure, the engaging portion 122 may be an outer fastener, an inner fastener, a column, an elastic fastener or a threaded body. As such, the engaging portion 122 can achieve the effect of coupling in response to different second objects 20, thus satisfying actual engagement requirements.

In one embodiment of the present disclosure, the limiting portion 121 is patterned as a limiting groove 121. The limiting groove 121 has a first limiting section 1211, a second limiting section 1212 and a communicating section 1213. The first limiting section 1211 and the second limiting section 1212 are located on two sides of the communicating section 1213, and the communicating section 1213 is in communication with the first limiting section 1211 and the second limiting section 1212, so that the first limiting section 1211, the communicating section 1213 and the second limiting section 1212 coordinate with the limiting structure 111 to limit the movement stroke of the fastener 12. Wherein, the first limiting section 1211 and the second limiting section 1212 limit an up-and-down movement stoke of the fastener 12, and the communicating section 1213 limits a rotational movement stroke of the fastener 12. The first limiting section 1211 and the second limiting section 1212 are patterned as a long limiting section and a short limiting section, wherein the long limiting section is for recovering a stoke of the engaging portion 122, and the short limiting section is for limiting the engaging portion 122 at a positioned position after the engaging portion 122 is engaged. Alternatively, the long limiting section is for limiting the engaging portion 122 at a positioned position after the engaging portion 122 is engaged, and the short limiting section is for recovering a stoke of the engaging portion 122.

As such, when the fastener moves 12, a force is applied at the head 123 and the head 123 is pressed downward to release the first limiting section 1211 from the limitation of the limiting structure 111, and at the same time to have the engaging portion 122 extend out of the body 11. Moreover, the head 123 is turned to allow the limiting structure 111 to pass through the communicating section 1213 and to cause the second limiting section 1212 to move the position of the limiting structure 111, and at the same time the engaging portion 122 is engaged with the second object 20. Once the engaging portion 122 is engaged with the second object 20, the second limiting section 1212 and the limiting structure 111 then limit the position of the actuated fastener 12, thus achieving the effect of secure engagement.

For disengagement, in the engaged state above, a force is applied at the head 123 and the head 123 is pressed downward to release the first limiting section 1212 from the limitation of the limiting structure 111, and at the same time to have the engaging portion 122 depart from the second body 20. Moreover, the head 123 is turned in a reverse direction to allow the limiting structure 111 to pass through the communicating section 1213 and to cause the second limiting section 1211 to move the position of the limiting structure 111, and at the same time the engaging portion 122 is withdrawn into the body 11, hence disengaging the engaging portion 122 from the second object 20. Thus, the body 11 can be assembled with the first object 10, and the fastener 12 can be engaged with the second object 20 or be disengaged from the second object 20 so as to complete quick coupling and separation of the two objects, further achieving effects of repeated quick coupling and separation.

In one embodiment of the present disclosure, the body 11 has a direction positioning portion 113, and the first object 10 has a corresponding direction positioning portion 101 for correspondingly positioning a relative position or a relative assembly position of the assembly portion 112, the engaging portion 122, the head 123, the body 11, the second object 20, the limiting portion 121, the limiting structure 111, the first limiting section 1211, the second limiting section 1212 or the second object 20, so as to provide aligned engagement or corresponding rotational engagement during assembly. Thus, the present disclosure can satisfy actual application requirements.

In one embodiment of the present disclosure, an elastic unit 13 is further included. Two ends of the elastic unit 13 are pressed against the body 11 and the head 123 of the fastener 12, respectively. With the pressing of the elastic unit 13, the fastener 12 is constantly located at an engaging position, or constantly located at a disengaging position. Wherein, a force of the spring force of the elastic unit 13 constantly pushes the head 123 of the fastener 12 away from the body 11 or constantly pulls the head 123 of the fastener 12 close to the body 11. As such, when the fastener 12 moves, a force is applied at the head 123 and the head 123 is pressed downward to compress the elastic unit 13, so as to release the first limiting section 1211 from the limitation of the limiting structure 111, and at the same time to have the engaging portion 122 extend out of the body 11. Moreover, the head 123 is turned to allow the limiting structure 111 to pass through the communicating section 1213 and to cause the second limiting section 1212 to move the position of the limiting structure 111, and at the same time the engaging portion 122 is engaged with the second object 20. Once the engaging portion 122 is engaged with the second object 20, the elastic unit 13 is elastically released to push the body 11 and the head 123, so that the second limiting section 1212 and the limiting structure 111 then limit the position of the actuated fastener 12, thus achieving the effect of secure engagement.

For disengagement, in the engaged state above, a force is applied at the head 123, the head 123 is pressed downward and the elastic unit 13 is compressed to release the second limiting section 1212 from the limitation of the limiting structure 111, and at the same time to have the engaging portion 122 depart from the second body 20. Moreover, the head 123 is turned in a reverse direction to allow the limiting structure 111 to pass through the communicating section 1213 and to cause the first limiting section 1211 to move the position of the limiting structure 111, and at the same time the engaging portion 122 is withdrawn into the body 11 so that the elastic unit 13 is elastically released to push the body 11 and the head 123, hence disengaging the engaging portion 122 from the second object 20 so as to be in a state ready for engagement of a next time. Thus, the body 11 can be assembled with the first object 10, and the fastener 12 can be engaged with the second object 20 or be disengaged from the second object 20 so as to complete quick coupling and separation of the two objects, further achieving effects of repeated quick coupling and separation.

In one embodiment of the present disclosure, the limiting structure 111 is configured to be assembled with the body 11 or to be a formed integral with the body 11.

In one embodiment of the present disclosure, the body 11, the fastener 12 or the head 123 is formed by means of metal injection molding, plastic injection molding, injection molding, CNC processing molding, forging molding or rolling molding.

Figure 6:
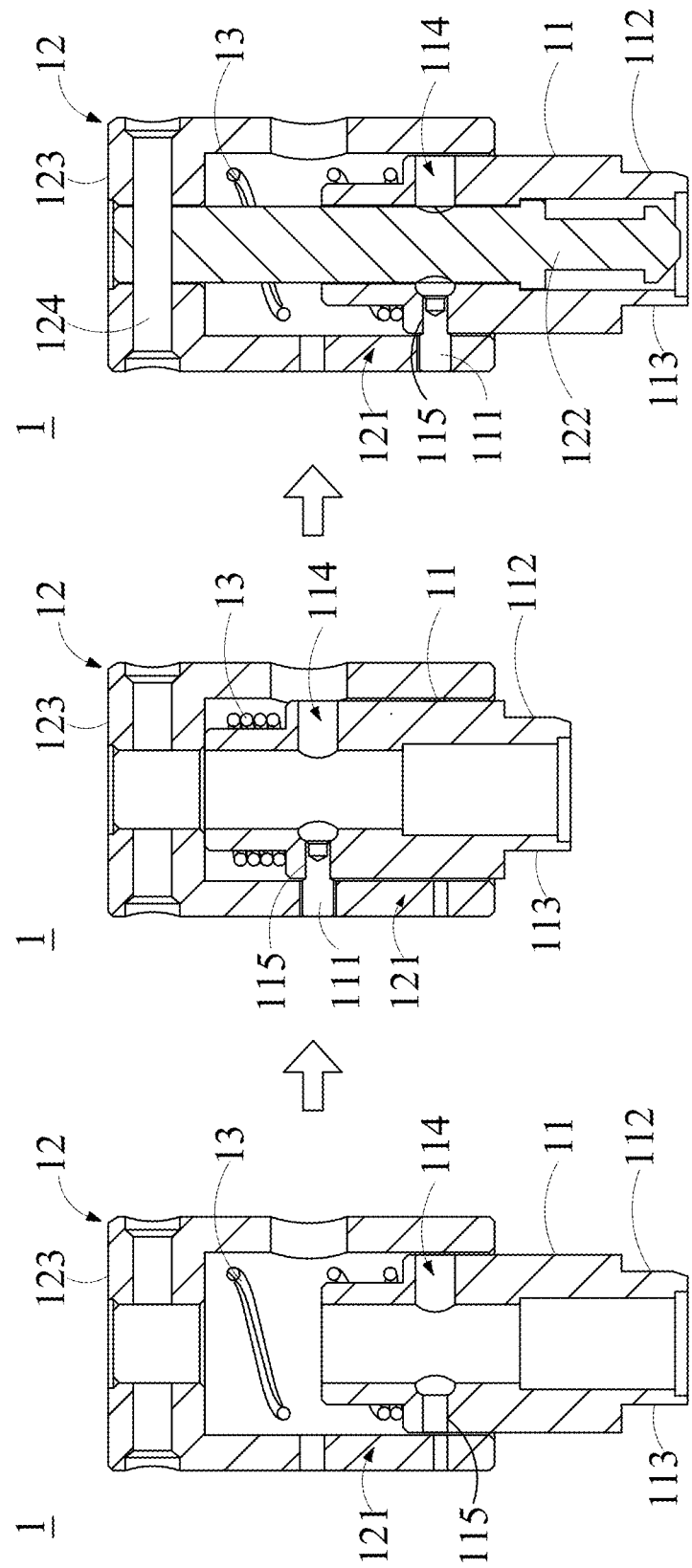
FIG. 6 is a section schematic diagram of a fastener structure in a state of assembly of the present disclosure.

Referring to FIG. 6, as shown, to assemble the fastener structure 1 of the present disclosure, the elastic unit 13 is first arranged at the body 11, the head 123 of the fastener 12 is arranged at the body 11, and the limiting structure 111 is passed through the limiting portion 121, so that the limiting structure 111 is assembled on one side of the body 11 and is limited at the limiting portion 121.

In one embodiment of the present disclosure, to assemble the fastener structure 1 of the present disclosure, the elastic unit 13 is first arranged at the body 11, the head 123 of the fastener 12 is elastically pressed downward and arranged at the body 11, and the limiting structure 111 is passed through the limiting portion 121, so that the limiting structure 111 is assembled on one side of the body 11 and is limited at the limiting portion 121.

In one embodiment of the present disclosure, to assemble the fastener structure 1 of the present disclosure, the fastener 12 is first arranged at the body 11, and the limiting structure 111 is passed through the limiting portion 121, so that the limiting structure 111 is assembled on one side of the body 11 and is limited at the limiting portion 121.

In one embodiment of the present disclosure, to assemble the fastener structure 1 of the present disclosure, the limiting structure 111 is first assembled on one side of the body 11, the elastic unit 13 is placed at the body 11 and then the head 123 of the fastener 12 is placed, so that the limiting structure 111 enters the limiting portion 121, and the engaging portion 122 of the fastener 12 is assembled at the head 123 of the fastener 12 via the joining portion 124 so as to be movably assembled with the body 11.

In one embodiment of the present disclosure, to assemble the fastener structure 1 of the present disclosure, the limiting structure 111 is first assembled on one side of the body 11 and then the head 123 of the fastener 12 is placed, so that the limiting structure 111 enters the limiting portion 121 in a longitudinal direction, and the engaging portion 122 of the fastener 12 is assembled at the head 123 of the fastener 12 via the joining portion 124 so as to be movably assembled with the body 11.

In one embodiment of the present disclosure, to assemble the fastener structure 1 of the present disclosure, the limiting structure 111 is first assembled on one side of the body 11 and then the fastener 12 is placed, so that the limiting structure 111 enters the limiting portion 121 so as to be movably assembled with the body 11.

In one embodiment of the present disclosure, once an assembly process of the limiting structure 111 entering the limiting portion 121 is complete, the other end of the engaging portion 122 of the fastener 12 (one end that is non-engaged with the second object 20) is arranged inside the body 11 or outside the body 11, so as to complete the assembly with the head 123.

In one embodiment of the present disclosure, to assemble the fastener structure 1 of the present disclosure, the limiting structure passes through a hole 114 on one side of the body 11 so as to be assembled at another hole 115 of the body 11, wherein the hole 114 is larger than the another hole 115, and the another hole 115 is smaller than the limiting structure 111, so that the limiting structure 111 can first pass through the hole 114 and then be assembled at the another hole 115.

Figure 7:
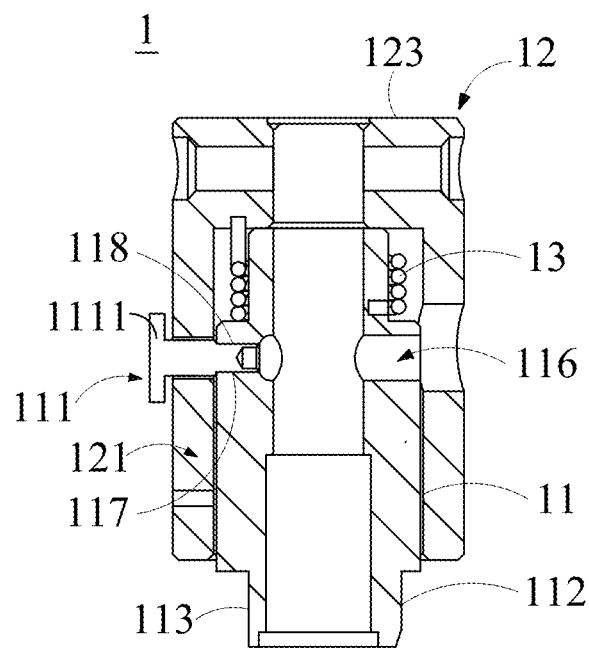
FIG. 7 is a section schematic diagram of a fastener structure in another state of assembly of the present disclosure.

Referring to FIG. 7, as shown in the drawing, in one embodiment of the present disclosure, the body 11 has a tool opening 116 and an assembly hole 117 corresponding to each other. The tool opening 116 is for an assembly tool (not shown) to enter the body 11, so that the assembly tool assembles the limiting structure 111 at the assembly opening 117. The tool opening 116 is larger than the assembly opening 117. The limiting structure 111 is assembled by means of rivet connection or expansion connection on one side of the body 11 (or the limiting structure 111 and the body 11 are a formed integral), and the limiting structure 111 has a stop portion 118, which is for stopping at a stop position of the rivet connection or expansion connection of the limiting structure 111.

In one embodiment of the present disclosure, the elastic unit 13 is a torsion spring having one end pressing against the body 11 and the other end pressing against the fastener 12, so that the fastener 12 reciprocally rotates due to a torsion force.

In one embodiment of the present disclosure, the limiting structure 111 has a block portion 1111, a width of the block portion 1111 is larger than that of the limiting portion 121, and the block portion 1111 and the limiting portion 12 perform non-rotational or rotational positioning.

Figure 8:
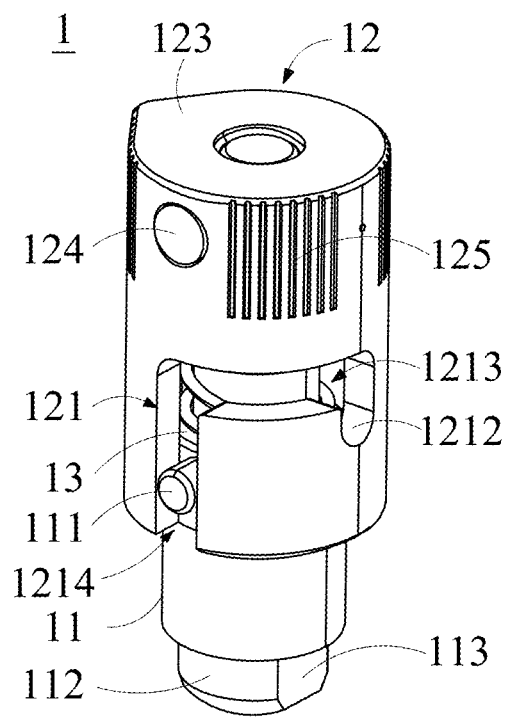
FIG. 8 is a schematic diagram of an appearance of a fastener structure according to another embodiment of the present disclosure.
Figure 9:
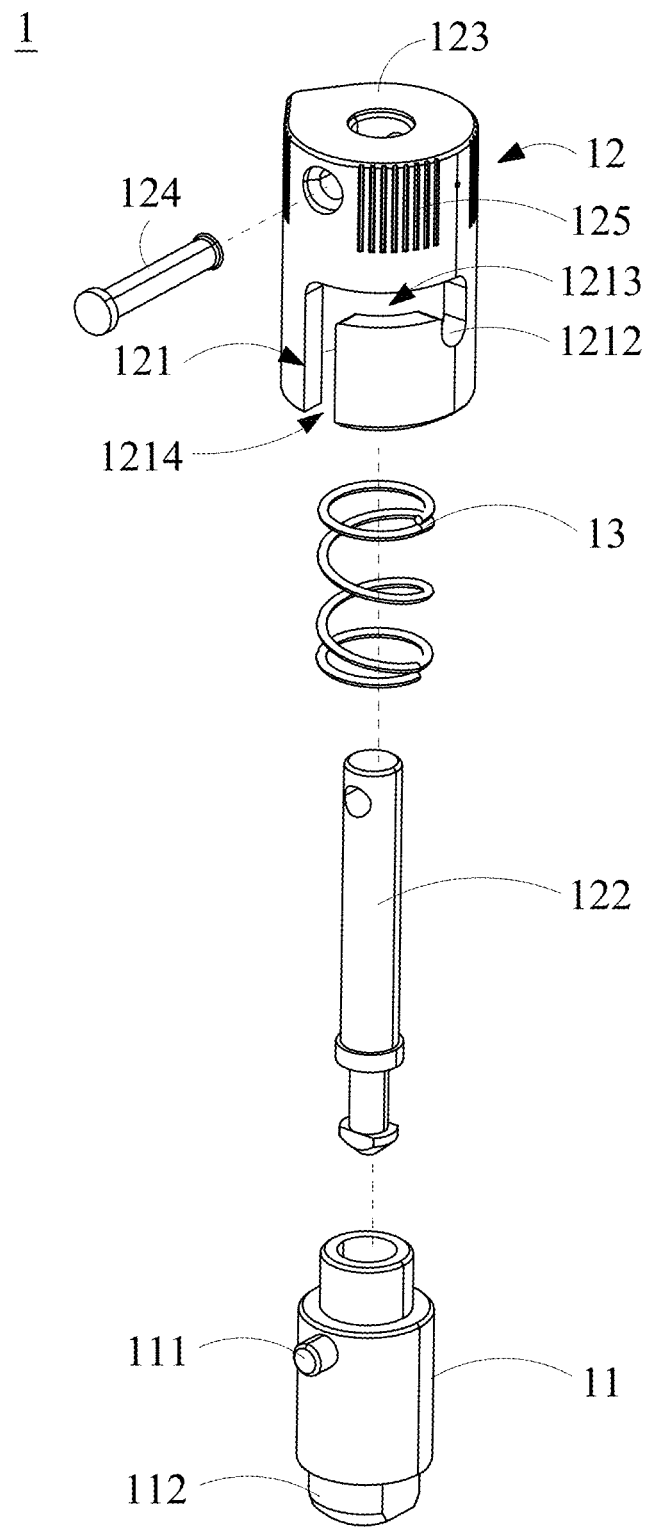
FIG. 9 is an exploded schematic diagram of a fastener structure according to another embodiment of the present disclosure.
Figure 10:
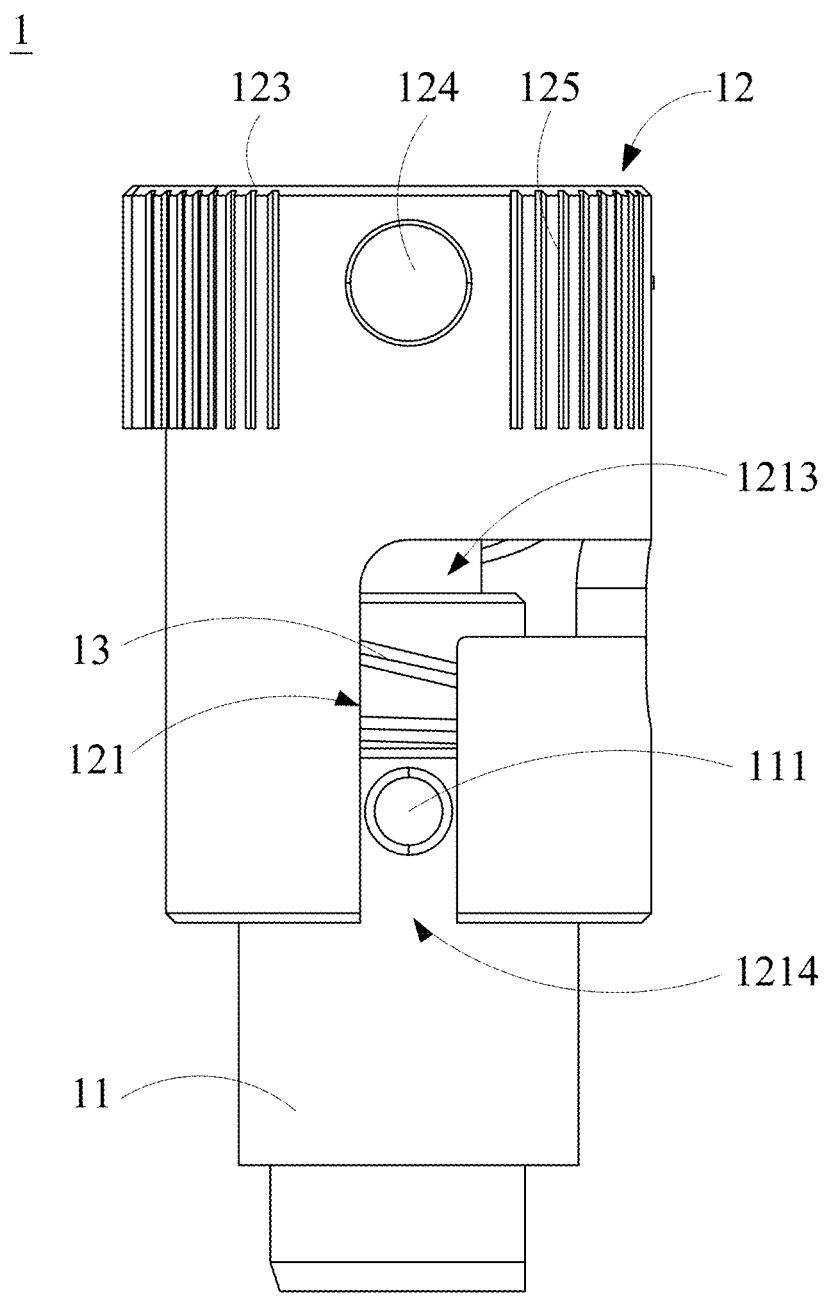
FIG. 10 is a side schematic diagram of a fastener structure according to another embodiment of the present disclosure.

Referring to FIG. 8 to FIG. 10, this embodiment differs from the foregoing embodiments in that, the limiting portion 121 is a through groove structure with an entrance 1214, and the entrance 1214 is in communication with the communicating section 1213.

As such, when the fastener moves 12, a force is applied at the head 123 and the head 123 is pressed downward to compress the elastic unit 13, so as to release the entrance 1214 from the limitation of the limiting structure 111, and at the same time to have the engaging portion 122 extend out of the body 11. Moreover, the head 123 is turned to allow the limiting structure 111 to pass through the communicating section 1213 and to cause the second limiting section 1212 to move the position of the limiting structure 111, and at the same time the engaging portion 122 is engaged with the second object. Once the engaging portion 122 is engaged with the second object, the elastic unit 13 is elastically released to push the body 11 and the head 123, so that the second limiting section 1212 and the limiting structure 111 then limit the position of the actuated fastener 12, thus achieving the effect of secure engagement.

For disengagement, in the engaged state above, a force is applied at the head 123, the head 123 is pressed downward and the elastic unit 13 is compressed to release the second limiting section 1212 from the limitation of the limiting structure 111, and at the same time to have the engaging portion 122 depart from the second body. Moreover, the head 123 is turned in a reverse direction to allow the limiting structure 111 to pass through the communicating section 1213 and to cause the entrance 1214 to move the position of the limiting structure 111, and at the same time the engaging portion 122 is withdrawn into the body 11 so that the elastic unit 13 is elastically released to push the body 11 and the head 123, hence disengaging the engaging portion 122 from the second object so as to be in a state ready for engagement of a next time. Thus, the body 11 can be assembled with the first object, and the fastener 12 can be engaged with the second object or be disengaged from the second object so as to complete quick coupling and separation of the two objects, further achieving effects of repeated quick coupling and separation.

While the present disclosure has been described by means of specific embodiments, numerous modifications and variations could be made thereto by those skilled in the art without departing from the scope and spirit of the present disclosure set forth in the claims.

What is claimed is:

1. A fastener structure, comprising:
   a body having a limiting structure, the body for assembling at a first object, an assembly portion is provided with a bottom portion of the body; and
   a fastener movably assembled with the body, the fastener having a limiting portion, the limiting portion coordinating with the limiting structure to limit a movement stroke of the fastener, so as to engage or disengage the fastener with or from a second object;
   wherein the fastener comprises an engaging portion and a head, and the limiting portion is arranged at the head, so that the limiting portion coordinates with the limiting structure to limit a movement stroke of the head, allowing the engaging portion to engage with or disengage from the second object;
   wherein the engaging portion is fixed coupled at the head, and the engaging portion is movably assembled with the body;
   wherein the engaging portion is a rod, the engaging portion has a blocking portion at one end, the assembly portion and the blocking portion are at same side relative to the body, the engaging portion has a narrow section adjacent to the blocking portion, the first object and the second object are overlapped and fastened to the body by the blocking portion.

2. The fastener structure according to claim 1, wherein the limiting portion has a first limiting section, a second limiting section and a communicating section, the first limiting section and the second limiting section are located on two sides of the communicating section, and the communicating section is in communication with the first limiting section and the second limiting section, so that the first limiting section, the communicating section and the second limiting section coordinate with the limiting structure to limit the movement stroke of the fastener; or, the limiting portion has a first limiting section and a communicating section, and the communicating section and the first limiting section coordinate with the limiting structure to limit the movement stroke of the fastener; or, the limiting portion has a second limiting section and a communicating section, and the communicating section and the second limiting section coordinate with the limiting structure to limit the movement stroke of the fastener.

3. The fastener structure according to claim 2, wherein the first limiting section and the second limiting section limit an up-and-down movement stroke of the fastener; or, the communicating section limits a rotational movement stroke of the fastener.

4. The fastener structure according to claim 2, wherein the first limiting section or the second limiting section is patterned as a long limiting section or a short limiting section, wherein the long limiting section is for recovering a stoke of the engaging portion, and the short limiting section is for limiting the engaging portion at a positioned position after the engaging portion is engaged; or, the first limiting section or the second limiting section is patterned as a long limiting section or a short limiting section, wherein the long limiting section is for limiting the engaging portion at a positioned position after the engaging portion is engaged, and the short limiting section is for recovering a stoke of the engaging portion.

5. The fastener structure according to claim 1, further comprising an elastic unit, wherein two ends of the elastic unit are pressed against the body and the fastener, respectively;
   with the pressing of the elastic unit, the fastener is constantly located at an engaging position, or constantly located at a disengaging position; alternatively, a force of a spring force constantly pushes the head of the fastener away from the body or constantly pulls the head of the fastener close to the body.

6. The fastener structure according to claim 5, wherein the elastic unit is a torsion spring having one end pressing against the body and the other end pressing against the fastener, so that the fastener reciprocally rotates due to a torsion force.

7. The fastener structure according to claim 1, wherein the limiting portion is a limiting groove without an entrance, or the limiting portion is a limiting groove with an entrance.

8. The fastener structure according to claim 1, wherein the body has a direction positioning portion, and the first object has a corresponding direction positioning portion for correspondingly positioning a relative position or a relative assembly position of the assembly portion, an engaging portion, a head, a body, a second object, a limiting portion, a limiting structure, a first limiting section, a second limiting section or a second object, so as to provide aligned engagement or corresponding rotational engagement during assembly.

9. The fastener structure according to claim 1, wherein the limiting structure has a block portion, a width of the block portion is larger than that of the limiting portion, and the block portion and the limiting portion perform non-rotational or rotational positioning.

10. The fastener structure according to claim 1, wherein the fastener has an engaging portion and a head, and once the limiting structure completely enters the limiting portion, one end of the engaging portion of the fastener that is non-engaged with the second object is then assembled with the head.

11. An assembly method of a fastener structure, for assembling the fastener structure of claim 1, the method comprising: first arranging the fastener at the body, and then passing the limiting structure through the limiting portion, so that the limiting structure is assembled at the body and is limited at the limiting portion.

12. An assembly method of a fastener structure, for assembling the fastener structure of claim 1, the method comprising: first assembling the limiting structure at the body, placing the head of the fastener so that the limiting structure enters the limiting portion, and then assembling the engaging portion of the fastener at the head of the fastener so as to be movably assembled with the body.

13. An assembly method of a fastener structure, for assembling the fastener structure of claim 1, the method comprising: first assembling the limiting structure at the body, and placing the fastener so that the limiting structure enters the limiting portion so as to be movably assembled with the body.

14. An assembly method of a fastener structure, for assembling the fastener structure of claim 5, the method comprising: first arranging the elastic unit on the body, arranging the head of the fastener at the body, and then passing the limiting structure through the limiting portion, so that the limiting structure is assembled at the body and is limited at the limiting portion.

15. An assembly method of a fastener structure, for assembling the fastener structure of claim 5, the method comprising: first assembling the limiting structure at the body, placing the elastic unit at the body, placing the head of the elastic unit so that the limiting structure enters the limiting portion, and then assembling the engaging portion of the fastener at the head of the fastener so as to be movably assembled with the body.

* * * * *